Figure 1A:
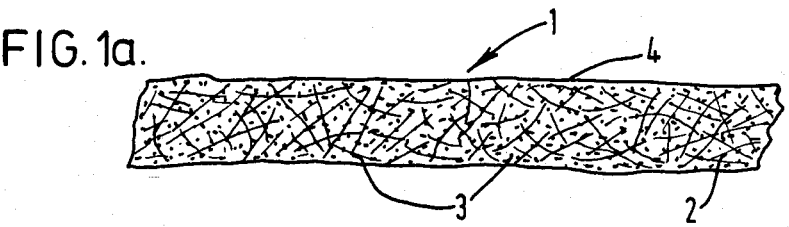

United States Patent [19]

Radvan et al.

[11] Patent Number: 4,690,860
[45] Date of Patent: Sep. 1, 1987

[54] FIBRE REINFORCED COMPOSITE PLASTICS MATERIAL

[75] Inventors: Bronislaw Radvan, Flackwell Heath; Andrew Till, Marlow, both of England

[73] Assignee: The Wiggins Teape Group Limited, Basingstoke, England

[21] Appl. No.: 946,630

[22] Filed: Dec. 29, 1986

Related U.S. Application Data

[63] Continuation of Ser. No. 884,306, Jul. 15, 1986, abandoned, which is a continuation of Ser. No. 688,806, Jan. 4, 1985, abandoned.

[30] Foreign Application Priority Data

Jan. 6, 1984 [GB] United Kingdom ............... 8400294

[51] Int. Cl.⁴ ................... B32B 5/14; B32B 5/22; B32B 27/04; B27N 3/10
[52] U.S. Cl. ................... 428/290; 264/257; 264/263; 264/266; 428/283; 428/297; 428/304.4; 428/306.6; 428/307.3; 428/317.9
[58] Field of Search ............ 428/283, 290, 297, 304.4, 428/306.6, 307.3, 317.9; 264/257, 263, 266

[56] References Cited

U.S. PATENT DOCUMENTS

| | | |
|---|---|---|
| 3,172,072 | 3/1965 | Willy ........................ 428/304.4 |
| 3,617,594 | 11/1971 | Willy ........................ 428/320.2 |
| 3,621,092 | 11/1971 | Hofer ........................ 264/322 |
| 3,734,985 | 5/1973 | Greenberg ................. 264/45.3 |
| 3,975,483 | 8/1976 | Rudloff ...................... 264/137 |
| 4,273,981 | 6/1981 | Nopper ................. 219/10.49 R |
| 4,362,778 | 12/1982 | Andersson et al. ........ 428/283 |
| 4,386,943 | 6/1983 | Gümbel et al. ............. 428/283 |
| 4,426,470 | 6/1984 | Wessling et al. ........... 524/35 |
| 4,440,819 | 4/1984 | Rosser et al. .............. 428/107 |
| 4,481,248 | 11/1984 | Fraige ........................ 428/283 |
| 4,496,623 | 1/1985 | Fraige ........................ 428/283 |
| 4,498,957 | 2/1985 | Sasaki et al. ............... 162/146 |
| 4,508,777 | 4/1985 | Yamamoto et al. ........ 428/288 |
| 4,543,288 | 9/1985 | Radvan et al. ............. 428/297 |

FOREIGN PATENT DOCUMENTS

| | | |
|---|---|---|
| 1504828 | 4/1969 | Fed. Rep. of Germany . |
| 843154 | 8/1960 | United Kingdom . |
| 1008833 | 11/1965 | United Kingdom . |
| 1110659 | 4/1968 | United Kingdom . |
| 1113792 | 5/1968 | United Kingdom . |
| 1129757 | 10/1968 | United Kingdom . |
| 1263812 | 2/1972 | United Kingdom . |
| 1306145 | 2/1973 | United Kingdom . |
| 1329409 | 9/1973 | United Kingdom . |
| 1348896 | 3/1974 | United Kingdom . |
| 2065016 | 6/1981 | United Kingdom . |
| 2096195 | 10/1982 | United Kingdom . |

OTHER PUBLICATIONS

*Fibre Foam*, VIIth International Congress on Rheology, 1976, Gothenburg, Sweden, S. Turner and F. N. Cogswell, 3 pages.

*Primary Examiner*—William J. Van Balen
*Attorney, Agent, or Firm*—Burns, Doane, Swecker & Mathis

[57] ABSTRACT

A fibre reinforced plastics structure comprising a porous matrix of thermoplastics material and reinforcing fibres, the pores of said matrix being wholly or partly invested with a thermosetting plastics material.

13 Claims, 6 Drawing Figures

FIBRE REINFORCED COMPOSITE PLASTICS MATERIAL

This application is a continuation of application Ser. No. 884,306 filed July 15, 1986, which is a continuation of application Ser. No. 688,806 filed Jan. 4, 1985, all abandoned.

This invention relates to fibre reinforced plastics materials for use in producing plastics mouldings. In particular, it relates to such materials which embody both thermosetting and thermoplastic components in such a manner that the advantages of both are maximised.

Thermosetting materials are usually available to the moulder in the form of liquids, or of powders which soften upon heating. They may be used to impregnate a reinforcing fabric or may be mixed with short reinforcing fibres, or with fillers. When formed into a desired shape and heated to a specific temperature, thermosetting materials undergo an irreversible chemical change and solidify into the formed shape. The resulting article exhibits, in general, good stiffness and strength, and, especially good resistance to heat and prolonged mechanical stress.

However, because the thermosetting process is irreversible, reject articles cannot be scrapped and the material reused. They also tend to be relatively brittle. More importantly, the forming process is slow, being of the order of several minutes, because the mould must be held closed until the curing process has been completed. For this reason especially, thermosetting materials do not lend themselves to modern high speed production techniques. As a result, and despite the advantages which articles moulded from thermosetting materials afford, they are being displaced by thermoplastics materials.

Examples of thermosetting materials are phenol-formaldehyde resin, urea and melamine formaldehyde resins, epoxy resins, unsaturated polyesters, and polyurethanes.

The thermoplastics are usually available to the fabricator in granular or particulate form or as a sheet. They soften upon heating and can be pressed, moulded, extruded or cast into a desired shape into which they solidify upon cooling. The softening and hardening processes are relatively fast so that the article can be moulded, hardened by cooling and ejected from the mould in a matter of seconds rather than minutes. Fillers and reinforcing materials may be included. When the thermoplastics material is in the form of a sheet, the reinforcement will be in the form of fabrics or fibre mats and in the case of granular or particulate materials, in the form of short fibres. Articles moulded from thermoplastic materials tend to be lighter and often tougher than in the case of thermosetting materials. But their stiffness is less, especially under conditions of prolonged stress. Their resistance to heat is, of course, poor.

Examples of thermoplastics are the polyolefins, polystyrenes, polyamides, polyvinyl chloride, and the saturated polyesters, together with blends of these materials.

Attempts have been made to combine thermoplastics and thermosetting materials in a single article so as to achieve at least some of the technical advantages of each. Thus for example in the manufacture of an article such as a bath tub, an initial moulding is produced rapidly from a thermoplastics sheet by heating and vacuum forming. After coating in and removal from the mould, the outside of the cooled moulding is then covered with liquid thermosetting polyester resin, reinforced with short glass fibres, which is then allowed to cure slowly whilst maintaining its shape. This has the advantage of avoiding long dwell times in the mould, but defects arise in the end product when in use, due to insufficient adhesion between the two materials. This results from differential thermal expansion which produces warping and delamination.

It is among the objects of the present invention to provide a method of combining thermoplastic and thermosetting materials in such a manner that articles formed from the resulting composite avoid at least some of the disadvantages of the known techniques.

According to one aspect of the present invention there is provided a reinforced plastics structure comprising a porous matrix comprising 40% to 60% by weight of thermoplastic material and 20% to 60% by weight of single reinforcing fibres having a high modulus of elasticity (as herein defined), and being between about 7 and 50 millimeters long; and a cured thermoset plastics material investing at least the pores at a surface of said matrix.

The invention also extends to sheets or articles formed from such a plastics structure prior to curing of the thermoset plastics material.

The porous structure may be formed by bonding the thermoplastics material, in a wholly or substantially unconsolidated particulate form, with the reinforcing fibres in the manner described in copending United Kingdom Patent Application No. 84.00290 filed Jan. 6, 1984 (European Patent Publication No. 148760).

Preferably however, the porous matrix comprises a material made as described in copending United Kingdon Patent Application No. 84.00290 filed Jan. 6, 1984 (European Patent Publication No. 148760) and which has then been consolidated by heating and cooling under pressure and reheated to cause the resilience of the fibres to re-expand and render the material porous as described in copending United Kingdom Patent Application No. 84.00293 filed Jan. 6, 1984 (European Patent Publication No. 148763).

The fibre reinforced plastics structure of the invention affords the fast forming capability of the thermoplastics material with the superior mechanical and heat resistance properties of the thermosetting material. Because the two materials are combined in an intimate manner, separation is virtually impossible. Furthermore, there is little risk of distortion and separation due to differential thermal expansion.

The matrix may be completely impregnated or invested with thermosetting liquid, in which case articles formed from the matrix will be relatively dense. Or the surface layers only of the matrix may be impregnated, for example, by coating. This will result in a lighter article but may provide a sufficient increase in stiffness as compared with the unimpregnated matrix, together with a sealed surface which will prevent the ingress of other fluids such as water or oil, into the expanded central zone.

An excess of liquid thermosetting materials may also be applied to the surface where the article to be formed is required to have a very smooth, glossy appearance. This is particularly desirable where the moulded article is to be used as a substitute for elements previously formed from sheet metal. Such surfaces are difficult to achieve with conventional fibre reinforced materials.

A low temperature curing liquid resin may be used to impregnate the matrix, which is then stored to enable curing of the resin to proceed slowly at room temperature, or at least at a temperature considerably below the softening point of the thermoplastics material. Alternatively, the porous matrix is initially impregnated with a relatively slow curing thermosetting resin. It is then heated rapidly to the moulding temperature of the thermoplastics component, rapidly transferred to a moulding press and pressed into the desired shape before the curing of the thermosetting component is complete.

In a further variation, a thin, porous, fibre reinforced thermoplastics matrix is fully impregnated with the thermosetting resin, heated to the moulding temperature of the thermoplastics material and laminated with one or more hot unimpregnated sheets and then formed in a hot press. In a variation of the last mentioned procedure, a further impregnated sheet is added to the other side of the unimpregnated sheets which thus form an unimpregnated core in the article when formed.

Figure 1B:
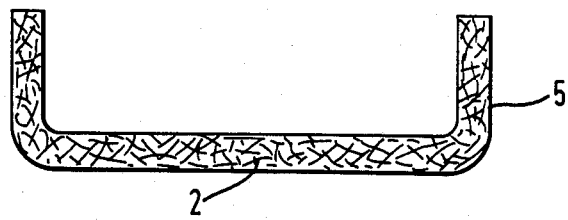
Figure 2A:
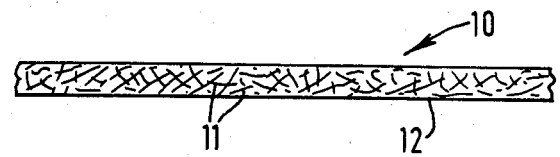
Figure 2B:
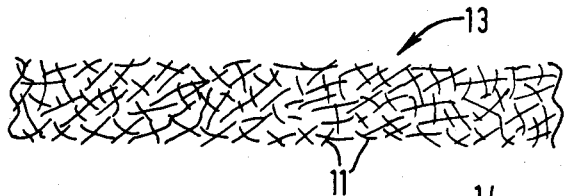
Figure 2C:
Figure 2D:

The invention will now be further described with reference to the accompanying drawings in which:

FIG. 1a is a cross-section through a first form of fibre reinforced plastics structure according to the invention, FIG. 1b is a cross-section through a plastics moulding formed from a structure of FIG. 1a, FIG. 2a is a cross-section through a consolidated fibre reinforced thermoplastics sheet, FIG. 2b is a cross-section through an intermediate structure formed from the sheet of FIG. 2a, FIG. 2c is a fibre reinforced plastics structure according to the invention formed from the structure of FIG. 2b and, FIG. 2d is a plastics moulding formed from the structure of FIG. 2c.

Referring first to FIG. 1a, this shows a porous sheet like structure 1 consisting of a porous matrix of glass reinforcing fibres 2 and particulate thermoplastics material 3, the matrix being impregnated throughout with a cured liquid thermosetting resin 4. Optionally, the liquid thermosetting resin 4 may be applied only to the surface of the matrix so that the core regions remain free of thermoset material when cured.

The matrix comprised of the fibres 2 and particulate thermoplastics material 3 is made in accordance with the process set out in copending United Kingdom Patent Application No. 84 00290 filed Jan. 6, 1984. Alternatively, it may be formed by adding a blowing agent, heating and compressing the matrix and then relieving both the heat and pressure to allow expansion to take place and product a porous material.

FIG. 1b shows a moulding 5 formed from the impregnated sheet material of FIG. 1a. In order to form a moulding, the sheet 1 is initially heated until the thermoplastics content 3 has become plastic. The sheet is then quickly transferred to the mould and moulding effected before the thermosetting resin has cured. After the mould temperature has been reduced sufficiently to solidify the thermoplastic component, the moulding can be removed from the mould so that the thermosetting material can cure slowly at a controlled temperature.

Turning now to FIG. 2, FIG. 2a shows a consolidated sheet 10 comprising glass reinforcing fibres 11 dispersed through a solid thermoplastics matrix 12. Since the sheet 10 has been formed by the application of heat and pressure and then cooled whilst under pressure, the fibre reinforcement remains trapped in a stressed condition within the solid thermoplastics matrix.

Turning now to FIG. 2b, this shows the sheet 10 after heating. As the thermoplastics content 12 becomes plastic, it adheres to the fibres 11 which, being released from their trapped condition, cause the whole structure to expand and form as open porous matrix 13.

FIG. 2c shows the matrix 13 of FIG. 2b after impregnation or surface coating with the thermosetting resin 14 as described with reference to FIG. 1. The impregnated or coated matrix 13 is then heated and moulded into a moulding 15, as shown in FIG. 2d in the manner described above with reference to FIGS. 1a and 1b.

The fibrous content of the sheet is between about 7 and about 50 millimeters long since this will permit free flow of the materials comprising the composite sheet during the moulding process.

EXAMPLE NO. 1

The use of powdered post-formable thermoset resin

A sample of reinforced sheet material was prepared by dispersing the following ingredients in an aqueous foam, forming a web, and drying

| | |
|---|---|
| Polypropylene powder (Grade GS 608E) supplied by ICI Ltd. | 60 parts by weight |
| Glass fibre, 12 millimeters long, × 11 microns diameter (Grade R18D) supplied by O.C.F. Ltd. | 40 parts by weight |
| Pre-catalysed unsaturated polyester powder (Mark 3118) supplied by Decostone B.V. | 10 parts by weight |

The sample was placed in a forming tool of a hydraulic press, with platens heated at 170° C., which was closed to a pressure of 700 lb. per square inch of the sample, at the end of a heating period, when the heating was turned off, and the platens cooled with circulating water, whilst under full pressure. Upon release, a well-formed shape with a moderate degree of draw was released.

The experiment was repeated to make a control sample, omitting the polyester additive. Corresponding pieces of both samples were tested with the following results:

| | Control | Experiment |
|---|---|---|
| Maximum bending stress, MPa | 61 | 50 |
| Flexural modulus MPa | 3700 | 3400 |

(i.e. a partly thermoset articles was obtained at the expense of a moderate loss in strength.)

EXAMPLE NO. 2

Impregnation with liquid thermosetting resins

Physical Properties

Samples of thermoplastic reinforced sheet material were made, as in Example No. 1 with the following compositions:

reinforcement: glass fibre, 12 millimeters long, 11 microns diameter (as in Example No. 1)

Matrix:
  Sample 1: polypropylene powder (Grade PXC 81604) supplied by ICI Ltd.—52 percent by weight Sample 2: polyvinyl chloride powder, (Grade Corvic S57/116) supplied by ICI Ltd.—70 percent by weight.

Sample 3: acrylic resin powder, (Grade Diakon LG 156) supplied by ICI Ltd.—70 percent by weight.

The three samples were consolidated into flat dense sheets in a hydraulic press, heated to 190° C. (polypropylene) or 210° C. (polyvinylchloride) or 200° C. (acrylic) and a pressure of 200–300 psi was applied at the end of the heating cycle of approximately 5 minutes. The press was then opened to varying extents for different samples, which were thus allowed to re-expand to various thicknesses and densities, and cooled.

Control portions of samples 1, 2 and 3 were then tested for Flexural Modulus and Ultimate Tensile Strength, whilst the remainders were divided into two impregnated by quick immersion in different liquid thermosetting resin solutions:
either: phenol-formaldehyde resin (Grade MS 7814) supplied by Ciba-Geigy Ltd.
or: melamine-formaldehyde resin (Grade BL434) supplied by B.I.P. Chemicals Ltd., dissolved in water to a concentration of 50 percent by weight.

The impregnated samples were then dried in an air-circulation oven at 100° C. for a period of 1 hour approximately, cooled and weighed in order to determine the pick-up of resin solids, and then cured in a flat press at 170°–200° C., either at contact pressure (so as to produce only partly-impregnated materials) or under a pressure of 250 psi, when cure and consolidation were achieved in approximately 5 minutes. They were then cooled and tested as above.

The results are summarised in the attached Table No. 1. They show that the impregnation of the expanded samples with thermosetting resins produced an increase in strength and stiffness; also the sample remained sufficiently thermoplastic at the end of the drying cycle to be capable of consolidation before curing.

Visual examination showed the samples to be uniformly and finely impregnated, with no visible boundaries between the thermoplastic, and thermosetting, regions.

Samples No. 1A and 4 in the table were also tested for hardness at different temperatures by the following procedure: a piece of the sample resting on a metal support was placed in an air circulating oven, and the temperature raised to 15° C. After 5 minutes the support and the sample were quickly taken out of the oven, and the hardness of the sample was measured using a Shore D instrument by Shore Instrument & Manufacturing Co. Another piece of the sample was then placed on the support in the oven, and the procedure repeated at several higher temperatures.

TABLE NO. 1

Example No. 2.

| Experiment | Sample No. | Matrix | Grammage g/m² | Liquid Resin Type | Liquid Resin pick-up % by weight | Thickness mm Before Impregnation | Thickness mm Final | Flexural Modulus MPa | Ultimate Tensile Strength MPa |
|---|---|---|---|---|---|---|---|---|---|
| Control | 1A | PP | 1280 | None | 0 | 1.85 | 1.85 | 2860 | 46.5 |
|  | 2A | PP | 1280 | None | 0 | 2.36 | 2.36 | 2530 | 42.0 |
|  | 3A | PP | 1280 | None | 0 | 2.80 | 2.80 | 2030 | 28.9 |
| Partial | 3 | PP | 1330 | PF | 47 | 2.36 | 2.59 | 4200 | 64 |
| Impregnation | 4 | PP | 1330 | PF | 42 | 2.36 | 2.57 | 6100 | 46 |
|  | 7 | PVC | 2920 | PF | 17 | 4.31 | 3.47 | 3400 | 18 |
|  | 8 | PVC | 2920 | PF | 20 | 4.31 | 3.39 | 2600 | 22 |
| Full | 9 | ACR | 2740 | MF | 15 | 3.91 | 2.48 | 6500 | 55 |
| Impregnation | 10 | ACR | 2740 | MF | 17 | 3.91 | 2.36 | 9300 | 66 |
| Consolidation | 6 | PP | 1330 | PF | 24 | 2.36 | 1.84 | 8030 | 57 |

PP = polypropylene
PVC = polyvinylchloride
ACR = acrylic
PF = phenol formaldehyde
MF = melamine formaldehyde The results of the tests are shown in Table 2 below:

TABLE NO. 2

Example No. 2

| Description | Temperature °C. | Hardness (Shore) |
|---|---|---|
| Control = no impregnant | 10 | 80 |
|  | 15 | 75–76 |
|  | 80 | 62–67 |
|  | 120 | 57–65 |
|  | 160 | 31–33 |
|  | 180 | 6 |
| Impregnated with phenol formaldehyde resin | 10 | 53–65 |
|  | 15 | 53–59 |
|  | 80 | 52–55 |
|  | 120 | 51–53 |
|  | 160 | 40–48 |
|  | 180 | 37–40 |

The results show that the material impregnated with liquid thermosetting resin retains its hardness over a greater range of temperatures.

Also, the material no longer expanded in thickness on reaching the higher temperatures, demonstrating the restraining action of the thermoset component.

EXAMPLE NO. 3

Impregnation with liquid thermosetting resins

Formability

A sample was prepared as for samples 3 and 4 in Table 1 of Example No. 2. with the following difference: after impregnation and drying, the sample was pre-heated briefly in an air oven at 180° C., and placed quickly in a shaped tool in a toggle-type press heated at 180° C. The press was closed fast to a pressure of some 2650 psi for a period of 5 minutes. Upon opening the press, a well-formed article of a moderate degree of draw, was released.

EXAMPLE NO. 4

Impregnation with liquid thermosetting resins by transfer from a thermoplastic film Physical Properties When dealing with resins which cure too fast to be preheated heated to the moulding temperatures of the thermoplastic matrix; or which produce copious irritant or flammable fumes during such pre-heating, the following modification of the procedure in Example No. 2 was adopted.

Samples prepared as Nos. 1, 2 and 3 in Table No. 1 of Example No. 2. were pre-heated in a oven for 5 minutes at 200° C., or until they visibly expanded in thickness, and became soft and flexible to touch. In the meantime, two pieces of polycarbonate film (Grade Lexan) of a weight of 300 g/m² each, and a thickness of 0.26 mm, supplied by General Electrical (Europe) Co. Ltd. were cut to the approximate size of the sample, and spread out flat on a table. A quantity of unsaturated polyester resin (Grade Crystic 198), catalysed with Catalyst Powder B, both supplied by Scott Bader Co. Ltd. was poured on to the surface of each piece of film, to form two thin puddles.

When the sample was sufficiently hot, it was quickly taken out of the oven, and placed down on to the surface of the puddle on the first piece of the film, when the liquid resin became immediately absorbed in the porous expanded surface, to act as a weak adhesive. The other side of the sample was then lowered on to the surface of the puddle on the second piece of film, with the same result. The whole combination was replaced in the oven for a period of 10-20 seconds, until the film visibly softened but did not melt and shrink. It was then taken out, and placed between the platens of a hydraulic press, pre-heated to 120° C., and then kept for 15 minutes at contact pressure. It was then removed from the press, cooled and tested. The results are shown in the Table below:

TABLE NO. 3

| | Example No. 4 | | |
|---|---|---|---|
| Sample Number | Resin Pick-up percent by weight | Flexural Modulus MPa | Ultimate Tensile Strength MPa |
| 10A | 44 | 2700 | 33 |
| 9A | 50 | 3100 | 50 |
| 8A | 54 | 3100 | 53 |
| 5A | 65 | 3300 | 48 |
| 4A | 73 | 3200 | 49 |
| 7A | 76 | 2900 | 41 |
| 6A | 98 | 3400 | 48 |

It will be appreciated that in order to facilitate handling in large scale production, the details of the procedure above may be altered: e.g. a partly gelled, or high-viscosity resin may be coated on to the film, and the film then applied to the hot sample, rather than vice-versa.

EXAMPLE NO. 5

Impregnation with liquid thermosetting resins by transfer from a thermoplastic film Formability Samples were prepared as in Example No. 4 using various amounts of liquid resin puddle on the film. After re-heating in the oven, they were placed in the shaped tool of Example No. 3 in a toggle-shaped press, and the press closed for 30 seconds at 130° C., to a pressure of some 250 psi. They were then removed, lightly clamped in a rig, and left to complete the cure in an oven at 160° C. for 10 minutes. Well formed, undistorted articles with strongly adhering glossy film surface, were obtained.

In a variant of this procedure, a relatively small puddle of the liquid resin was spread on one piece of film only, and applied to one side only of the sample. The sample still released well after 30 seconds from the press, and a glossy well-adhering surface film was obtained, as before, but only on one side.

In another variant of this procedure, the film used was oriented polypropylene, which had been sprayed with a release agent before the puddle was applied to it. After formation and curing, the film was stripped off, leaving a smooth hard, non-glossy, partly thermoset surface.

EXAMPLE NO. 6

In-mould coating of expanded samples with liquid thermosetting resins

A sample of reinforced sheet material was made by the process described in Example No. 1 with the following composition.

Total grammage: 3000 g/m² of which

| | |
|---|---|
| polypropylene powder (as in Example No. 2.) | 60 parts by weight |
| glass fibre (as in Example No. 1) | 40 parts by weight |

The sample was placed in a forming tool of a hydraulic press, with platens heated at 170° C., which was closed to a pressure of 700 lb. per square inch of the sample, at the end of a heating period, when the heating was turned off, and the platens cooled with circulating water, whilst under full pressure.

The sample then was heated in an air circulating oven at 200° C. for approximately 5 minutes, that is until it visibly expanded in thickness and became soft and flexible to touch. The tool described in Example No. 3 was pre-heated to 130° C. in a toggle-type press. When the sample was ready, a quantity of unsaturated polyester resin (as in Example No. 3) sufficient to cover the lower part of the tool to a grammage of approximately 500 g/m² was poured into the lower part of the tool. The hot sample was quickly transferred from the oven into the tool, and the press closed fast to a pressure of some 250 psi, and held closed for 10 minutes, i.e. until the resin was sufficiently gelled and cured for the sample to release cleanly.

The sample was then lightly clamped in a rig, and allowed to cure in an oven at 140° C. for sufficient length of time to achieve full cure.

The article obtained was seen to be uniformly penetrated by the resin over the lower surface to give a hard and smooth thermoset surface. Some of the resin was also seen to have penetrated to the other side of the article with similar results.

In a variant of this procedure, the sample consisted of two pieces each of 1500 g/m² which were heated together, as before, to produce a two-layered sheet, of different compositions in each layer:

top layer: 25% glass fibre by weight: 75% polypropylene bottom layer: 48% glass fibre by weight: 75% polypropylene The bottom layer was seen to be much more expanded in thickness (as expected from the teaching in United Kingdom co-pending Application No. 84 00293 Filed Jan. 6, 1984) and the bottom layer showed only very little expansion.

The top part of the tool (in contact with the top layer) was modified to include more complex detail of ribs and bosses, and was mounted in a hydraulic press capable of closing to a pressure of 1500 psi over the area of the article.

Upon release, the article was seen to be uniformly impregnated over the bottom surface, and only very little resin penetrated to the top surface. However, the latter surface reproduced faithfully the fine detail of the tool.

It will be appreciated that the choice of the curing time will depend on the type of resin used for impregnation, and that much faster times may be obtained by this means.

Also, the liquid resins may be replaced by powdered resins, used for in-mould coating of known art, if so desired.

In either case, the advantage of the microporous structure of the hot expanded sheet permits even and thorough penetration, to ensure good adhesion of the coating, and the imparting of thermosetting properties to the article.

We claim:

1. A fibre reinforced plastics structure, comprising:
    a porous matrix comprising 40% to 60% by weight of thermoplastic material and 20% to 60% by weight of single reinforcing fibres having a high modulus of elasticity, and being between about 7 and 50 millimeters long, the matrix having pores and a surface; and
    a cured thermoset plastics material investing at least the pores at the surface of said matrix.

2. A fibre reinforced plastics structure as claimed in claim 1 in which the thermoplastic material of the matrix is in a substantially unconsolidated form and is bonded to the reinforcing fibres.

3. A fibre reinforced plastics structure as claimed in claim 1 in which the matrix is wholly invested with thermoset plastics material.

4. A fibre reinforced plastics structure as claimed in claim 1 in which a surface layer of thermoset plastics material is provided on said surface.

5. A fibre reinforced plastics structure as claimed in claim 1 further comprising a film adhered to said surface by said thermoset plastics material.

6. A fibre reinforced plastics structure as claimed in claim 1 wherein the reinforcing fibres are glass fibres.

7. A method of making a fibre reinforced plastics structure, comprising the steps of:
    forming a porous matrix comprising 40% to 60% by weight of thermoplastic material and 20% to 60% by weight of reinforcing fibres having a high modulus of elasticity, and being between about 7 and about 50 millimeters long, the matrix having a surface and pores;
    investing the pores of said structure, at least at the surface thereof, with liquid thermosetting resin; and curing said resin.

8. A method of making a fibre reinforced plastics structure as clamed in claim 7 in which the porous matrix is formed from a fibre reinforced thermoplastics material which has been consolidated by heating and cooling under pressure and then reheated to cause the resilience of the fibres to re-expand it and render the sheet porous.

9. A method of making a fibre reinforced plastics structure as claimed in claim 7 in which the porous material is invested with a liquid thermosetting resin which cures at a temperature below the softening temperature of the thermoplastic component of the material.

10. A method of making a fibre reinforced plastics structure as claimed in claim 7 in which, prior to curing of the thermosetting resin, the porous matrix is heated to the moulding temperature of the thermoplastics component, transferred to a moulding press and pressed into a desired shape.

11. A method of making a fibre reinforced plastics structure as claimed in claim 7 in which the thermosetting liquid resin is carried on a film or sheet which is applied to the matrix.

12. A method of making a fibre reinforced plastics structure as claimed in claim 11 in which the matrix is then heated and moulded.

13. A method of making a fibre reinforced plastics structure as claimed in claim 11 in which the liquid thermosetting resin is partly gelled or is a high viscosity resin.

* * * * *